United States Patent
Witte et al.

(10) Patent No.: US 11,204,893 B2
(45) Date of Patent: Dec. 21, 2021

(54) METHODS FOR FACILITATING EFFICIENT STORAGE OPERATIONS USING VARIABLE LENGTH ENCODED SEGMENT MAPS FOR DEDUPLICATED OBJECTS AND DEVICES THEREOF

(71) Applicant: NetApp, Inc., Sunnyvale, CA (US)

(72) Inventors: Wesley R Witte, Campbell, CA (US); Sundeep Singh, San Jose, CA (US)

(73) Assignee: NETAPP, INC., Sunnyvale, CA (US)

( * ) Notice: Subject to any disclaimer, the term of this patent is extended or adjusted under 35 U.S.C. 154(b) by 291 days.

(21) Appl. No.: 16/383,969

(22) Filed: Apr. 15, 2019

(65) Prior Publication Data
US 2020/0327096 A1 Oct. 15, 2020

(51) Int. Cl.
*G06F 16/11* (2019.01)
*G06F 16/13* (2019.01)
*G06F 16/174* (2019.01)
*G06F 16/14* (2019.01)

(52) U.S. Cl.
CPC ......... *G06F 16/128* (2019.01); *G06F 16/137* (2019.01); *G06F 16/14* (2019.01); *G06F 16/1748* (2019.01)

(58) Field of Classification Search
CPC ...... G06F 16/128; G06F 16/137; G06F 16/14; G06F 16/1748
See application file for complete search history.

(56) References Cited

U.S. PATENT DOCUMENTS 10,394,757 B2 *  8/2019  Cheung ............... G06F 16/1752
2013/0275447 A1 * 10/2013  Ben-Tsion ............ G06F 16/214
                                                          707/756

* cited by examiner

*Primary Examiner* — Irete F Ehichioya
*Assistant Examiner* — Xiaoqin Hu
(74) *Attorney, Agent, or Firm* — Troutman Pepper Hamilton Sanders LLP (Rochester)

(57) ABSTRACT

Methods, non-transitory computer readable media, and computing devices are disclosed that facilitate efficient storage operations using variable length encoded segment maps for deduplicated objects. A key name and elements of a segment list are received with a request to store an object. Each of the elements corresponds to a segment associated with the object and comprises a segment hash. A segment map is generated for the object. The segment map includes a header and entries. Each of the entries includes at least an expanded offset, one of the segment hashes, and a start offset. The segment map is stored in an object store, as associated with the key name, along with segment data included in at least one of the elements.

20 Claims, 5 Drawing Sheets

```
// One of these                                402
type segMapHeader struct {
version uint8 // Initial version 1
offsetBytes uint8
startOffsetBytes uint8
other... (TBD)
}
```

```
// Followed by one or more of these                                                              404
type segMapEntry struct {
offset uint64 // stored as 4 or 8 bytes, depending on offsetBytes in header.
hash [32]byte
startOffset uint32 // stored as 0,1,2, or 4 bytes, depending on startOffsetBytes in header.
}
```

METHODS FOR FACILITATING EFFICIENT STORAGE OPERATIONS USING VARIABLE LENGTH ENCODED SEGMENT MAPS FOR DEDUPLICATED OBJECTS AND DEVICES THEREOF

FIELD

This technology relates to data storage networks and, more particularly, to methods and devices for facilitating efficient storage operations using variable length encoded segment maps for deduplicated objects.

BACKGROUND

Cloud object stores are increasingly utilized to maintain backup or archive data on behalf of storage clients. In many implementations, the cloud object store is accessed by a storage client over a wide area network (WAN) (e.g., the Internet) via an application programming interface (API) (e.g., a representation state transfer (REST) API). For efficient data storage, the cloud object store can maintain deduplicated data such that a set of individual data segments stored as objects, or units of deduplication, make up particular data files or objects.

A common data management/protection strategy in data storage networks utilizes snapshots, which are fully usable copies of defined collections of data that contain an image of the data as it appeared at a particular point in time. In some implementations, an initial baseline snapshot is generated followed by periodic incremental snapshots. The incremental snapshots can then be combined periodically to generate new baseline snapshots, which are also referred to as synthetic full snapshots.

However, in many current cloud object stores, a data object must be fetched in its entirety, modified, and then rewritten in order to edit the data object. This limitation leads to inefficiencies with respect to modifying, or deleting portions of, existing data objects as snapshots are removed, as well as creating new data objects pieced together from several existing data objects when creating synthetic full snapshots.

BRIEF DESCRIPTION OF THE DRAWINGS

FIG. 4 is exemplary pseudocode illustrating an exemplary definition of a segment map describing a deduplicated object in an object store.

DETAILED DESCRIPTION

Figure 1:
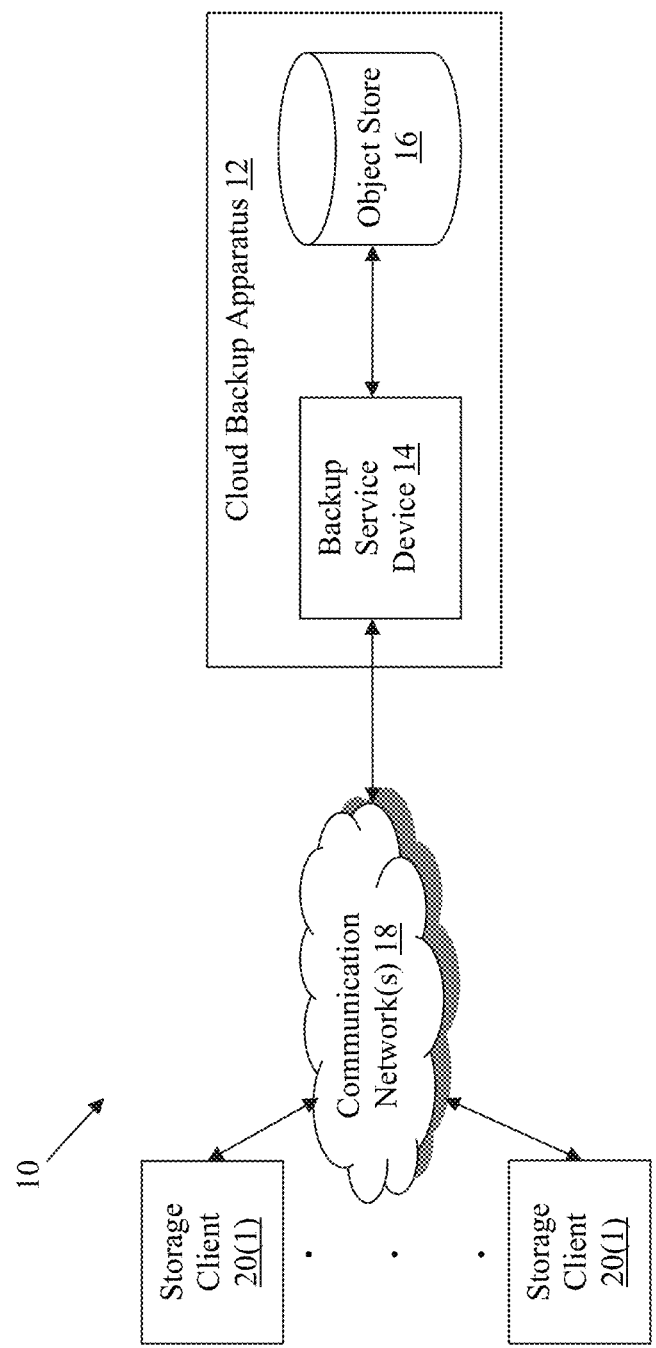
FIG. 1 is a block diagram of a network environment with an exemplary secure cloud backup apparatus with a backup service device.

A cloud storage network environment 10 including an exemplary cloud backup apparatus 12 is illustrated in FIG. 1. The cloud backup apparatus 12 in this example includes a backup service device 14 coupled to an object store 16 and, via communication network(s) (e.g., a wide area network (WAN)) 18, a plurality of storage clients 20(1)-20(n). The cloud storage network environment 10 may include other network devices such as one or more routers and/or switches, for example, which are well known in the art and thus will not be described herein. This technology provides a number of advantages including methods, non-transitory computer readable media, and devices that facilitate efficient storage operations using variable length encoded segment maps for deduplicated objects.

In this example, the backup service device 14 and object store 16 are illustrated as separate devices within the cloud backup apparatus 12. However, in other examples, the object store 16 can be integrated with the backup service device 14. In yet other examples, the object store 16 can be external to the cloud backup apparatus 12 (e.g., accessible to the backup service device 14 by one or more communication networks). Additionally, any number of object stores within or external to the cloud backup apparatus 12 can be coupled to the backup service device 14 in other examples, and other configurations can also be used.

Figure 2:
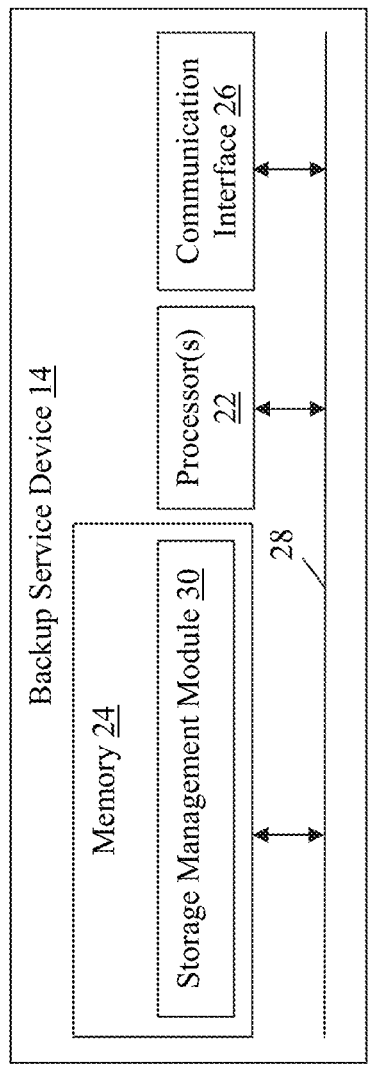
FIG. 2 is a block diagram of an backup service device.

Referring to FIG. 2, a block diagram of the backup service device 14 is illustrated. The backup service device 14 in this example is a proxy between the storage clients 20(1)-20(n) and the object store 16, and facilitates storage in the object store 16 of ingested data segments for objects deduplicated by the storage clients 20(1)-20(n) and transmitted to the backup service device 14 for backup or archival, for example. In this example, the backup service device 14 includes processor(s) 22, a memory 24, and a communication interface 26, which are coupled together by a bus 28 or other communication link.

The processor(s) 22 of the backup service device 14 may execute a program of stored instructions for one or more aspects of this technology, as described and illustrated by way of the embodiments herein, although the processor(s) 22 could execute other numbers and types of programmed instructions. The processor(s) 22 in the backup service device 14 may include one or more central processing units (CPUs) or general purpose processors with one or more processing cores, for example.

The memory 24 of the backup service device 14 may include any of various forms of read only memory (ROM), random access memory (RAM), flash memory, non-volatile or volatile memory, or the like, or a combination of such devices, for example. In this example, the memory 24 includes a storage management module 30, although other types and/or numbers of applications or modules can also be included in other examples.

The storage management module 30 communicates with the storage clients 20(1)-20(n) to provide a backup service for objects managed by the storage clients 20(1)-20(n). In the examples described and illustrated herein, the storage clients 20(1)-20(n) encrypt, compress, and deduplicate objects locally, and communicate data segments, or units of deduplication, which are received by the storage management module 30. The storage management module 30 also presents an application programming interface (API) (e.g., a representational state transfer (REST) API) to the storage clients 20(1)-20(n) for facilitating storage operations with respect to the ingested data segments and associated objects.

Figure 3:
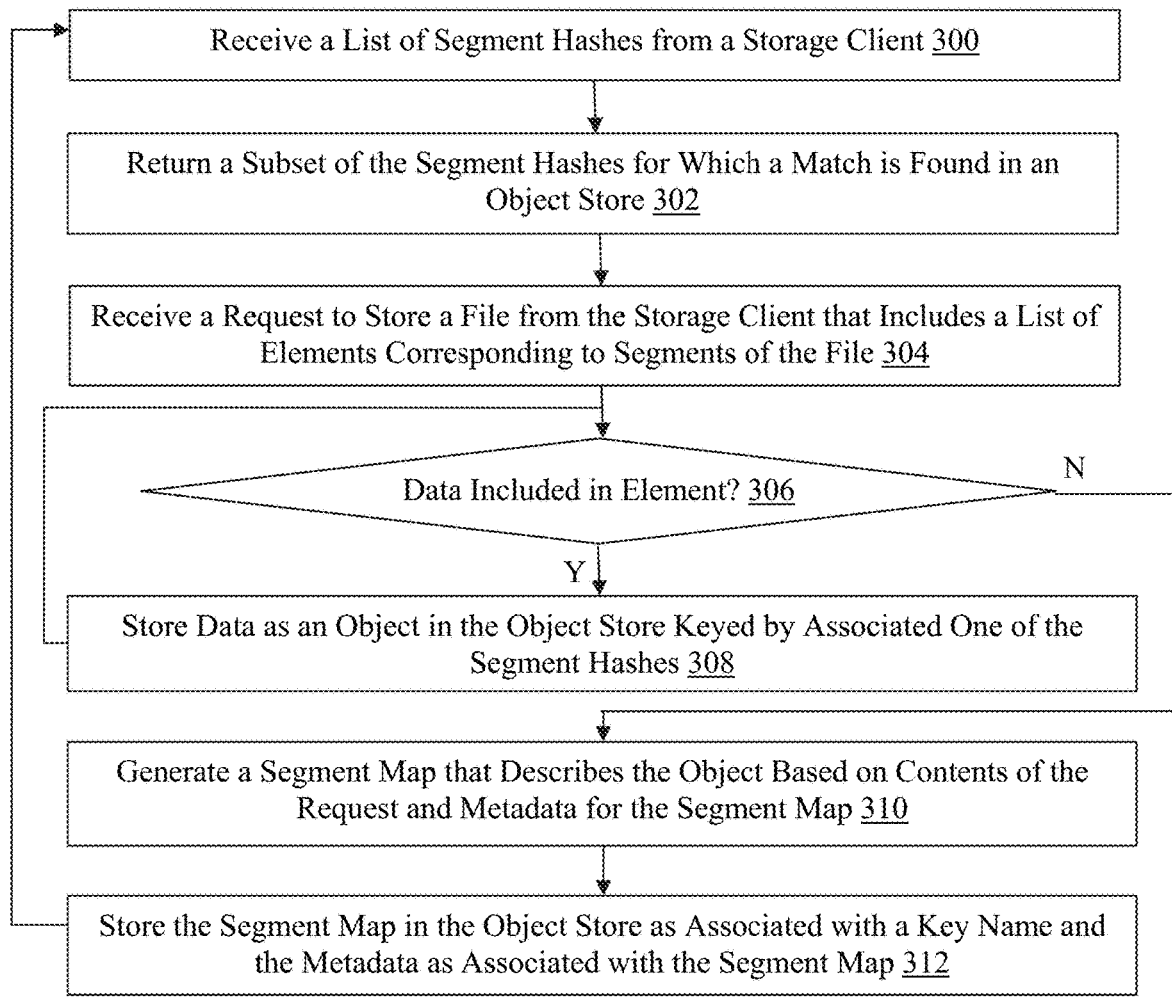
FIG. 3 is a flowchart of an exemplary method for storing deduplicated objects in an object store using variable length encoded segment maps.

In particular, the storage management module 30 generates, stores, and maintains/manipulates segment maps that describe objects for which associated data segments are ingested in response to API calls by the storage clients 20(1)-20(n), as described and illustrated in more detail later with reference to FIGS. 3-4. The segment maps are relatively small, each including a header and one or more entries, and facilitate relatively fast random access to data ranges in deduplicated objects.

The storage management module 30 utilizes the segment maps to facilitate efficient storage operations, such as hole punching or overwriting data, copying objects, copying object data, and truncating objects, examples of which are described and illustrated in more detail later with reference to FIG. 5. The storage operations allow the storage management module 30 to support synthetic full snapshots, for example, more efficiently via segment map manipulation and without copying object data or reading and rewriting data objects.

The communication interface 26 of the backup service device 14 operatively couples and communicates between the object store 16 and the storage clients 20(1)-20(n), which are coupled together by the communication network(s) 18, such as one or more local area networks (LANs) or WANs, for example, although other types and numbers of communication networks or systems with other types and numbers of connections and configurations to other devices and elements also can be used.

By way of example only, the communication network(s) 18 can use TCP/IP over Ethernet and industry-standard protocols, including HTTP/HTTPS, NFS, CIFS, SOAP, XML, LDAP, and SNMP, although other types and numbers of communication networks can be used. The communication network(s) 18 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

Referring back to FIG. 1, the object store 16 of the cloud backup apparatus 12 in this example is utilized by the backup service device 14 to store data segments ingested from the storage clients 20(1)-20(n). A set of the data segments represents a deduplicated object and the data segments are stored as data objects in the object store 16 and referenced by a segment map generated for the associated deduplicated object.

The object store 16 can include any number or type of data storage devices (e.g., public cloud storage server(s)) capable of storing data in the form of a set of objects. Accordingly, the object store 16 can include hard disk drives, optical disk-based storage, flash memory, solid state drives (SSDs), or any other type of non-volatile memory configured to store data objects in relatively long term storage for backup or archival purposes.

Each of the storage clients 20(1)-20(n) in this particular example includes processor(s), a memory, and a communication interface, such as a network adapter, cluster access adapter, and/or storage adapter, interconnected by a system bus. The storage clients 20(1)-20(n) can be primary or local storage controllers, or secondary or remote storage controllers, that provide applications with access to data stored within local data storage devices (not shown), which is archived in the object store 16, for example.

In one example, the local data storage devices host aggregates corresponding to physical local and remote data storage devices, such as local flash or disk storage, for example. The aggregates can include volumes, which are virtual data stores that define an arrangement of storage and one or more filesystems. The volumes can span a portion of a disk or other storage device, a collection of disks, or portions of disks, for example, and typically define an overall logical arrangement of data storage.

In one example, the volumes can include stored user data as objects that reside in a hierarchical directory structure within the volumes. Volumes are typically configured in formats that may be associated with particular storage systems, and respective volume formats typically comprise features that provide functionality to the volumes, such as providing the ability for volumes to form clusters and perform deduplication, among other functionality.

In one example, to facilitate access to stored data, a filesystem may be implemented that logically organizes the information as a hierarchical structure of directories and objects. In this example, respective objects may be implemented as a set of disk blocks of a particular size that are configured to store information, whereas directories may be implemented as specially formatted objects in which information about other objects and directories are stored.

Data can be stored as objects within a physical volume and/or a virtual volume, which can be associated with respective volume identifiers. The physical volumes correspond to at least a portion of physical storage devices (e.g., a Redundant Array of Independent (or Inexpensive) Disks (RAID system)) whose address, addressable space, location, etc. does not change. Typically the location of the physical volumes does not change in that the range of addresses used to access it generally remains constant. Virtual volumes, in contrast, can be stored over an aggregate of disparate portions of different physical storage devices. Virtual volumes may be a collection of different available portions of different physical storage device locations, such as some available space from disks, for example.

Each of the storage clients 20(1)-20(n) can also include a storage operating system configured to invoke storage operations in support of a file service implemented by each of the storage clients 20(1)-20(n). The storage operating system in this example can implement a RAID data loss protection and recovery scheme, as well as compression, encryption, and deduplication functionality. Accordingly, the storage operation system can deduplicate managed objects and send data segments, or units of deduplication, associated with the objects to the backup service device 14 to facilitate archival in the object store 16.

Although examples of the backup service device 14, object store 16, and storage clients 20(1)-20(n), are described and illustrated herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media (e.g., the memory 24) having instructions stored thereon for one or more aspects of the present technology, as described and illustrated by way of the examples herein, that, when executed by a processor (e.g., the processor(s) 22), cause the processor to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3 and 5, for example.

An exemplary method for facilitating efficient storage operations using variable length encoded segment maps for deduplicated objects will now be described with reference to FIGS. 1-5. Referring more specifically to FIG. 3, a flowchart of an exemplary method for storing deduplicated objects in an object store using variable length encoded segment maps is illustrated. In step 300 in this example, the backup service device 14 receives a list of segment hashes from one of the storage clients 20(1)-20(n).

In this example, the one of the storage clients 20(1)-20(n) performs deduplication of objects client-side and generates unique identifiers for units of deduplication associated with a deduplicated object, which are referred to herein as segment hashes. In other examples, the backup service device 14 can receive an object from one of the storage clients 20(1)-20(n) and perform a server-side deduplication to generate the segment hashes. The segment hashes can be generated by applying a hash function to segmented portions of an object to be deduplicated, for example, although other methods for generating the segment hashes can also be used.

The list of segments hashes can be received by the backup service device 14 via a request from one of the storage clients 20(1)-20(n). The request can be received via the communication network(s) 18 and a REST API exposed by the backup service device 14 to the one of the storage clients 20(1)-20(n), and can be in the form of a "GET SEGMENT REFERENCES" call, for example, although other methods of receiving the request can be used in other examples.

In step 302, the backup service device 14 returns a subset of the segment hashes for which a match is found in the object store 16 to the one of the storage clients 20(1)-20(n) in response to the list received in step 300. Accordingly, the backup service device 14 performs a comparison of each of the segment hashes in the received list of segment hashes to the contents of the object store 16 to determine whether a segment hash (and associated data segment) is currently stored in the object store 16. The backup service device 14 can maintain the segment hashes for each of the data segments stored in the object store 16 in a data structure to facilitate efficient comparison, for example, although the segment hashes can be maintained, and/or the comparison can be performed, in other ways in other examples.

In step 304, the backup service device 14 receives a request to store an object (or any other type of collection of data (e.g., a file) generally referred to herein as an object) from the one of the storage clients 20(1)-20(n). In some examples, the request is received via the communication network(s) 18 and a REST API exposed by the backup service device 14 to the one of the storage clients 20(1)-20(n), and can be in the form of a "PUT" call, for example, although other methods of receiving the request to store the object can be used in other examples. Accordingly, the request is used to write segment data to an object. If the object does not exist, the backup service device 14 creates the object and, if the object exists, it will be overwritten with the supplied segments. The request includes a series of segments to write into the object at a given offset for a given length. Any empty space between the segments is treated as zeros.

In this particular example, the request includes a key name and a list of elements corresponding to segments of the object. The key name in this example is a unique identifier of the deduplicated object to be stored. In some examples, the request received in step 304 can further include an offset and a length, along with the key name and elements of the segment list.

Each of the elements of the segment list included in the request received in step 304 corresponds to a segment associated with the object and comprises a segment hash. Each of the elements of the segment list can also include a relative expanded offset from the offset associated with the object (also referred to as the segment list offset), a segment expanded offset, and optional segment data. The relative expanded offset corresponds with the offset (e.g., in bytes), from the start of the object, of segments corresponding to the elements of the segment list. The expanded data length corresponds with the number of expanded bytes that the segments corresponding to the elements in the segment list represent.

Elements of the segment list that include the optional segment data correspond to segment hashes not in the subset of segment hashes returned to the one of the storage clients 20(1)-20(n) in step 302. In other words, if the element of the segment list includes segment data, then the segment data is not already stored in the object store 16. Otherwise, if the element of the segment list does not include segment data, then the associated segment hash is included in the subset of segment hashes, the segment data is already stored in the object store, and the element is effectively a reference to a pre-existing segment. Alternatively, an element of the segment list refers to a hole (i.e. a zero value) if the element does not include segment data and the associated segment hash is all zeros. In other examples, other types or numbers of data can be included in the request or in particular elements of the segment list, and a hole can be represented in other ways (e.g., via a flag).

In step 306, the backup service device 14 determines whether there is data included in an element of the segment list. The segment data is included when the associated segment hash is not included in the subset of segment hashes returned in step 302, indicating that the segment data is not currently stored in the object store 16. If the backup service device 14 determines that there is segment data included in the element of the segment list, then the Yes branch is taken to step 308.

In step 308, the backup service device 14 stores the segment data as a data object in the object store 16. The data object is keyed by the corresponding segment hash in the associated element of the segment list in this example, although other storage configurations can be used in other examples. Subsequent to storing the segment data, the backup service device 14 in this example returns to step 306 and determines whether there is an additional element of the segment list that includes segment data. Accordingly, the backup service device 14 effectively stores in the object store 16 all of the segment data included in element(s) of the segment list. However, if the backup service device 14 determines that there is not segment data included in the element of the segment list, then the No branch is taken to step 310.

In step 310, the backup service device 14 generates a segment map that describes the deduplicated object being stored in the object store 16 based on contents of the request received in step 304. The segment map in this example includes a header and a set of entries. The header includes a maximum data offset size, a maximum segment start offset size, and an optional version. The version can indicate a format of the segment map.

In this example, each of the entries in the segment map includes an expanded offset, one of the segment hashes, and a start offset. The expanded offset is a data offset in the object for one of the segments and the start offset is an offset into the one of the segments. In one particular example, the expanded offset is encoded in four to eight bytes based on the maximum data offset size in the header, although other sizes can also be used. Maintaining expanded offsets for each entry of the segment map advantageously facilitates relatively quick searching to the starting entry for a given object offset.

Each entry in the segment map is encoded using a number of bytes necessary to represent the maximum start offset size in the header such that all entries in a particular segment map are the same size. Since the start offset is a number of bytes, for example, to skip in the corresponding data segment, the start offset will be zero as a segment map is initially generated, but may be modified to be non-zero as a result of a synthetic write or hole punching, for example, as described and illustrated in more detail later.

A particular segment map entry may only represent a subset of the data contained in the referenced segment. Accordingly, the start offset in an entry indicates where the referenced data starts in the segment. The length of the referenced data can be determined for segment map entry i as segMapEntryi+1.offset−(segMapEntryi.offset+segMapEntryi.startOffset). The last entry in a segment map is always a hole in this example, and the associated offset represents the end of file (EOF) for the segment map.

The backup service device 14 also generates metadata associated with the segment map in step 310 in this example. The metadata can include EOF information including one or more of a stored object size, a minimum object size, or a current object size for the associated object.

The stored object size matches the value of the data offset for the trailing hole represented in the last entry of the segment map. The minimum object size corresponds with the stored object size when the segment map is initially generated, but can be modified due to a truncate operation, for example, as described and illustrated in more detail later. The current object size is the logical size of the object and also corresponds with the stored object size when the segment map is initially generated, but can be larger if the object is extended.

Referring more specifically to FIG. 4, exemplary pseudocode is illustrated that includes an exemplary definition of a segment map 400 describing a deduplicated object in the object store 16. The segment map 400 in this example includes a fixed length header 402 followed by an array of entries 404. Accordingly, a deduplicated object in this example is made of an ordered list of segments stored in the object store 16 as a segment map 400 in a format that can be searched by offset. The format of the segment map also facilitates truncating and extending without rewriting the entire segment map, and can be appended without requiring any parsing.

Referring back to FIG. 3, in step 312, the backup service device 14 stores the segment map in the object store 16 as associated with the key name included in the request received in step 304. The backup service device 14 also stores the generated metadata in the object store 16 as associated with the segment map. Utilizing the segment map, storage operations associated with the object can be carried out relatively efficiently. Additionally, storage management operations that leverage such storage operations for a plurality of objects, including maintenance of snapshots of the objects for data protection purposes, can be significantly improved with this technology.

Figure 5:
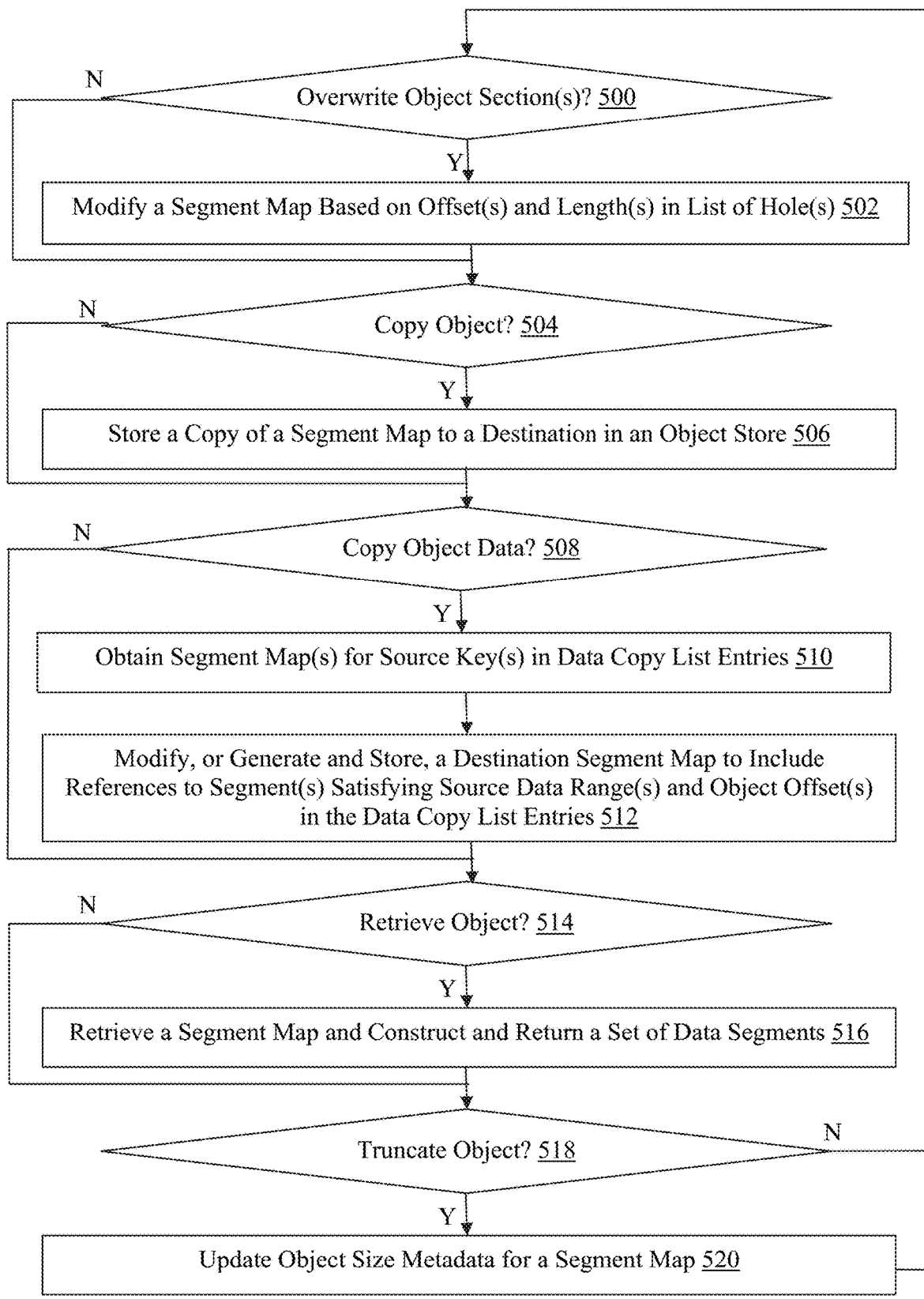
FIG. 5 is a flowchart of an exemplary method for performing exemplary storage operations on deduplicated objects described by segment maps in an object store.

Referring more specifically to FIG. 5, a flowchart of an exemplary method for performing exemplary storage operations on deduplicated objects described by segment maps in the object store 16 is illustrated. In step 500 in this example, the backup service device 14 determines whether a request to overwrite section(s) of a deduplication object is received from one of the storage clients 20(1)-20(n). The request can be received via the communication network(s) 18 and a REST API exposed by the backup service device 14 to the one of the storage clients 20(1)-20(n), and can be in the form of a "PUT HOLES" call, for example, although other methods of receiving the request to overwrite object section(s) can be used in other examples.

As used herein, a hole refers to a portion of an object that is no longer referenced and holes corresponding to data ranges within an object are replaced with zeros in this example, optionally to be lazily reclaimed in a garbage collection process. As one example, the storage clients 20(1)-20(n) can punch holes in objects when data is reclaimed during deletion of a snapshot. If the backup service device 14 determines in step 500 that a request to overwrite section(s) of an object is received, then the Yes branch is taken to step 502.

In step 502, the backup service device 14 modifies a segment map associated with the deduplicated object identified in the request based on object offset(s) and length(s) in a list of hole(s) in the request in order to indicate sections lacking data. The request to overwrite object section(s) in this example includes a key name, and a list of holes, although other information can also be included in the request. Each entry in the list of holes includes an offset and a length. The key name corresponds with an existing data object in this example.

Accordingly, the backup service device 14 retrieves the segment map corresponding to the key name and merges the segment map with, or modifies the segment map based on, the provided information regarding the holes in the list of holes. The modification can include modifying the start offset in one or more entries of the segment list in the segment map when a hole is punched at the beginning of a data segment, for example, although other types of modifications can also be used to place a hold in a section of a deduplicated data object.

The backup service device 14 in this example then rewrites the modified segment map to the object store 16. Since the segment map is relatively lightweight, the backup service device 14 more efficiently places holes in sections of data objects, by modifying the description of the data objects in the segment map, without requiring any manipulation of actual data. Subsequent to modifying the segment map in step 504, or if the backup service device 14 determines in step 500 that a request to overwrite object section(s) has not been received and the No branch is taken, then the backup service device 14 proceeds to step 504.

In step 504, the backup service device 14 determines whether a request to copy an object is received from one of the storage clients 20(1)-20(n). The request can be received via the communication network(s) 18 and a REST API exposed by the backup service device 14 to the one of the storage clients 20(1)-20(n), and can be in the form of a "PUT COPY" call, for example, although other methods of receiving the request to copy an object can be used in other examples.

The request to copy an object in this example includes a source key name and a destination key name, although other information can also be included in the request. The request to copy an object is a request to generate a server-side copy of a deduplicated object in the object store 16 and, if the target object exists, it is overwritten in this example. If the backup service device 14 determines that a request to copy an object has been received, then the Yes branch is taken to step 506.

In step 506, the backup service device 14 generates and stores a copy of a segment map corresponding to the object identified by key name in the received request. The segment map is stored based on an indication of the destination in the request, including at least the destination key name. Accordingly, duplicating a deduplicated object in this example requires copying and storing a relatively lightweight segment map without reading or writing any actual data associated with the object. Subsequent to storing a copy of the segment map in step 506, or if the backup service device 14 determines in step 504 that a request to copy an object has not been received and the No branch is taken, then the backup service device proceeds to step 508.

In step 508, the backup service device 14 determines whether a request to copy object data is received from one of the storage clients 20(1)-20(n). The request can be received via the communication network(s) 18 and a REST API exposed by the backup service device 14 to the one of the storage clients 20(1)-20(n), and can be in the form of a "PUT COPY RANGES" call, for example, although other methods of receiving the request to copy object data can be used in other examples. The request to copy object data in this example can be used by the storage clients 20(1)-20(n) to perform a server-side copy of data from one deduplicated object to another without moving any actual object data. Instead, of moving object data, data segment reference(s) are transferred from one object to another.

The request to copy object data in this example includes a destination key name and a list of data copies, although other information can also be included in the request. Each entry in the list of data copies includes a source key name, a destination offset, source offset, and a length. Optionally, each entry in the list of data copies is sorted by the destination offset. If the backup service device 14 determines in step 508 that a request to copy object data has been received, then the Yes branch is taken to step 510.

In step 510, the backup service device 14 obtains segment map(s) for each of the source key names in the data copy list entries. The backup service device 14 also retrieves a segment map for a destination object corresponding to the destination key name included in the request and to be overwritten. Alternatively, the backup service device 14 can generate a destination segment map for the destination object if it does not already exist in the object store 16.

In step 512, the backup service device 14 modifies the stored or generated destination segment map to include references to segment(s) satisfying the source data range(s) and object offset(s) in the data copy list entries. Accordingly, for each entry in the data copy list, the backup service device 14 identifies data segments that satisfy the source data range (i.e., source data offset for a specified length), and merges the segment references into the destination segment map at the appropriate offset. The destination segment map is then written to, or stored in, the object store 16.

To copy the object data, the backup service device 14 does not read or write any actual object data, and instead merely manipulates segment maps that describe the deduplicated data objects. Subsequent to modifying the destination segment map in step 512, or if the backup service device 14 determines in step 508 that a request to copy object data has not been received and the No branch is taken, then the backup service device 14 proceeds to step 514.

In step 514, the backup service device 14 determines whether a request to retrieve an object, or portion thereof, has been received from one of the storage clients 20(1)-20(n). The request can be received via the communication network(s) 18 and a REST API exposed by the backup service device 14 to the one of the storage clients 20(1)-20(n), and can be in the form of a "GET SEGMENTS" call, for example, although other methods of receiving the request to retrieve an object, or portion thereof, can be used in other examples.

The request to retrieve an object, or portion thereof, can be used by the one of the storage clients 20(1)-20(n) to retrieve a set of segments necessary to reconstruct a data range from a file, for example. In some examples, the request can include a key name, an offset, and a length, although other parameters can also be included in the request in other examples. If the backup service device 14 determines that a request for an object, or portion thereof, has been received, then the Yes branch is taken to step 516.

In step 516, the backup service device 14 retrieves a segment map based on the key name included in the request received in step 514. The backup service device 14 then uses the segment map, along with the received offset and length, to construct a set of data segments that can be returned to the one of the storage clients 20(1)-20(n) to facilitate generation by the one of the storage clients 20(1)-20(n) of the requested object or portion thereof. The backup service device 14 returns the constructed set of data segments along with information regarding which part of each of the data segments comprise each part of the requested object or portion thereof.

Since the one of the storage clients 20(1)-20(n) in this example may be encrypted or otherwise obfuscated the segments, the one of the storage clients 20(1)-20(n) is uniquely able to generate the requested object, or portion thereof, based on decrypting each of the data segments in the returned set. Subsequent to returning the set of data segments to the one of the storage clients 20(1)-20(n) in step 516, or if the backup service device 14 determines in step 514 that a request to retrieve an object has not been received from one of the storage clients 20(1)-20(n) and the No branch is taken, then the backup service device 14 proceeds to step 518.

In step 518, the backup service device 14 determines whether a request to truncate an object has been received from one of the storage clients 20(1)-20(n). The request can be received via the communication network(s) 18 and a REST API exposed by the backup service device 14 to the one of the storage clients 20(1)-0(n), and can be in the form of a "PUT OBJECT SIZE" call, for example, although other methods of receiving the request to truncate an object can be used in other examples.

The request to truncate an object in this example can be used by the storage clients 20(1)-20(n) to set the EOF for an object and effectively trim trailing sections of an object that are no longer needed, for example. In this example, the request to truncate an object includes a new object size, although other information can also be included in the request. If the backup service device 14 determines that a request to truncate an object has been received, then the Yes branch is taken to step 516.

In step 520, the backup service device 14 updates object size metadata for the segment map in the object store 16 in order to truncate the object corresponding to the key name in the request. The object size metadata could have been stored as described and illustrated in more detail earlier with reference to step 312 of FIG. 3, for example. Accordingly, the backup service device 14 can advantageously truncate an object in the object store 16 without modifying any object data or any segment maps.

Subsequent to updating the object size metadata in step 520, or if the backup service device 14 determines in step 518 that a request to truncate an object has not been received and the No branch is taken, then the backup service device 14 proceeds back to step 500 in this example. Accordingly, the backup service device 14 effectively waits for a request to be received in one of steps 500, 504, 508, 514, or 518 in this example, although other types of requests can be received in other examples. Additionally, one or more of steps 500-520 can be performed in a different order or in parallel in other examples, including for any number of the storage clients 20(1)-20(n). Accordingly, each request received from one of the storage clients 20(1)-20(n) is atomic, and multiple of steps 502, 506, 510 and 512, 516, and 520 cannot be performed for a single particular request received from one of the storage clients 20(1)-20(n).

With this technology, relatively small segment maps are advantageously utilized to facilitate efficient searching and other storage operations, including those that support snapshots for data maintained in a cloud object store. Since segment references in segment maps are a fixed size and sorted it is possible to quickly locate the proper segment reference for a given expanded offset, which facilitates relatively quick random access to data ranges in a deduplicated object. In examples in which the average segment size is known, random access to an expanded offset with this technology enables a binary search that provides an improvement over a linear search that would otherwise be necessary with variable sized entries.

This technology also facilitates hole punching sections of a file or other object without rewriting data segments. Moreover, file or objects can be truncated or extended with this technology without rewriting any segment maps. This technology also advantageously facilitates synthetic copy or construction of new segments maps from existing maps, as well as new objects without requiring any copying of actual object data.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   receiving, by a computing device, a key name and first and second elements of a segment list in a request to store a first object, wherein the first and second elements correspond to first and second segments of the first object and comprise first and second segment hashes, respectively, and the first element further comprises first data associated with the first segment;
   storing, by the computing device, the first data as a second object in an object store that is keyed by the first segment hash, wherein second data associated with the second segment is stored as a third object in the object store before the receipt of the request, keyed by the second segment hash, and shared by the first object and one or more other objects;
   generating, by the computing device, a segment map for the first object comprising a header and first and second entries comprising a first expanded offset, the first segment hash, and a first start offset and a second expanded offset, the second segment hash, and a second start offset, respectively, wherein the first and second expanded offsets comprise a relative starting location within the first object for the first and second segments, respectively, and the first and second start offsets comprise another relative starting location within the first and second segments for the first and second data, respectively; and
   storing, by the computing device, the segment map as associated with the key name in the object store.

2. The method of claim 1, wherein the header comprises a maximum data offset size and a maximum segment start offset size.

3. The method of claim 1, further comprising modifying, by the computing device, the segment map to indicate areas lacking data in response to a request to overwrite one or more sections of the first object.

4. The method of claim 1, further comprising storing, by the computing device, a copy of the segment map to a destination in response a received request to duplicate the first object that comprises the key name and an indication of the destination.

5. The method of claim 1, further comprising generating, by the computing device, a destination segment map comprising one or more references to one or more of the first or second segments in response to a request to copy the first object.

6. The method of claim 1, further comprising updating, by the computing device, object size metadata for the segment map in response to a request to truncate the first object.

7. A non-transitory machine readable medium having stored thereon instructions for facilitating efficient storage operations using variable length encoded segment maps for deduplicated objects comprising machine executable code which when executed by at least one machine causes the machine to:
   receive a key name and first and second elements of a segment list in a request to store a first object, wherein the first and second elements correspond to first and second segments of the first object and comprise first and second segment hashes, respectively, and the first element further comprises first data associated with the first segment;
   store the first data as a second object in an object store that is keyed by the first segment hash, wherein second data associated with the second segment is stored as a third object in the object store before the receipt of the request, keyed by the second segment hash, and shared by the first object and one or more other objects;
   generate a segment map for the first object comprising a header and first and second entries comprising a first expanded offset, the first segment hash, and a first start offset and a second expanded offset, the second segment hash, and a second start offset, respectively, wherein the first and second expanded offsets comprise a relative starting location within the first object for the first and second segments, respectively, and the first and second start offsets comprise another relative starting location within the first and second segments for the first and second data, respectively; and
   store the segment map as associated with the key name in the object store.

8. The non-transitory machine readable medium of claim 7, wherein the header comprises a maximum data offset size and a maximum segment start offset size.

9. The non-transitory machine readable medium of claim 7, wherein the machine executable code when executed by the machine further causes the machine to modify the segment map to indicate areas lacking data in response to a request to overwrite one or more sections of the first object.

10. The non-transitory machine readable medium of claim 7, wherein the machine executable code when executed by the machine further causes the machine to store a copy of the segment map to a destination in response a received request to duplicate the first object that comprises the key name and an indication of the destination.

11. The non-transitory machine readable medium of claim 7, wherein the machine executable code when executed by the machine further causes the machine to generate a destination segment map comprising one or more references to one or more of the first or second segments in response to a request to copy the first object.

12. The non-transitory machine readable medium of claim 7, wherein the machine executable code when executed by the machine further causes the machine to update object size metadata for the segment map in response to a request to truncate the first object.

13. A computing device, comprising:
a memory containing machine readable medium comprising machine executable code having stored thereon instructions for facilitating efficient storage operations using variable length encoded segment maps for deduplicated objects; and
a processor coupled to the memory, the processor configured to execute the machine executable code to cause the processor to:
receive a key name and first and second elements of a segment list in a request to store a first object, wherein the first and second elements correspond to first and second segments of the first object and comprise first and second segment hashes, respectively, and the first element further comprises first data associated with the first segment;
store the first data as a second object in an object store that is keyed by the first segment hash, wherein second data associated with the second segment is stored as a third object in the object store before the receipt of the request, keyed by the second segment hash, and shared by the first object and one or more other objects;
generate a segment map for the first object comprising a header and first and second entries comprising a first expanded offset, the first segment hash, and a first start offset and a second expanded offset, the second segment hash, and a second start offset, respectively, wherein the first and second expanded offsets comprise a relative starting location within the first object for the first and second segments, respectively, and the first and second start offsets comprise another relative starting location within the first and second segments for the first and second data, respectively; and
store the segment map as associated with the key name in the object store.

14. The computing device of claim 13, wherein the header comprises a maximum data offset size and a maximum segment start offset size.

15. The computing device of claim 13, wherein the processor is further configured to execute the machine executable code to further cause the processor to modify the segment map to indicate areas lacking data in response to a request to overwrite one or more sections of the first object.

16. The computing device of claim 13, wherein the processor is further configured to execute the machine executable code to further cause the processor to store a copy of the segment map to a destination in response a received request to duplicate the first object that comprises the key name and an indication of the destination.

17. The computing device of claim 13, wherein the processor is further configured to execute the machine executable code to further cause the processor to generate a destination segment map comprising one or more references to one or more of the first or second segments in response to a request to copy the first object.

18. The computing device of claim 13, wherein the processor is further configured to execute the machine executable code to further cause the processor to update object size metadata for the segment map in response to a request to truncate the first object.

19. The computing device of claim 13, wherein the processor is further configured to execute the machine executable code to further cause the processor to determine that the second segment hash comprises a matching segment hash in the object store in response to a list of segment hashes for the first object received from a storage client prior to receipt of the request to store the first object.

20. The computing device of claim 13, wherein the processor is further configured to execute the machine executable code to further cause the processor to generate a full synthetic snapshot using the segment map and without accessing the first or second data.

* * * * *